No. 734,060. PATENTED JULY 21, 1903.
H. GRUBB.
SIGHT MOUNTING FOR GUNS.
APPLICATION FILED NOV. 19, 1901.
NO MODEL. 6 SHEETS—SHEET 1.

Witnesses:
James W. Head.

Inventor:
Howard Grubb

No. 734,060. PATENTED JULY 21, 1903.
H. GRUBB.
SIGHT MOUNTING FOR GUNS.
APPLICATION FILED NOV. 19, 1901.
NO MODEL. 6 SHEETS—SHEET 3.

Witnesses:
James W. Head

Inventor:
Howard Grubb

No. 734,060. PATENTED JULY 21, 1903.
H. GRUBB.
SIGHT MOUNTING FOR GUNS.
APPLICATION FILED NOV. 19, 1901.
NO MODEL. 6 SHEETS—SHEET 6.

Witnesses:
James W Head

Inventor.
Howard Grubb
By Julius C Divall
His Atty

No. 734,060. Patented July 21, 1903.

UNITED STATES PATENT OFFICE.

HOWARD GRUBB, OF DUBLIN, IRELAND.

SIGHT-MOUNTING FOR GUNS.

SPECIFICATION forming part of Letters Patent No. 734,060, dated July 21, 1903.

Application filed November 19, 1901. Serial No. 82,936. (No model.)

*To all whom it may concern:*

Be it known that I, HOWARD GRUBB, a subject of the King of Great Britain and Ireland, residing at Dublin, Ireland, have invented Improvements in Sight-Mountings for Guns, of which the following is a specification.

This invention has reference to improvements in sight-mountings for small-arms, guns, and ordnance, (herein included in the expression "guns,") whereby sighting devices of various kinds, but preferably of the type described in the specification of Letters Patent No. 683,203, of 1900, can be supported and elevated in a steadier and more advantageous manner than heretofore.

The invention has for its object to provide a sight-mounting for guns whereby a sight can be easily, quickly, and accurately adjusted in a vertical or approximately vertical direction and be at all times held in a steady manner both laterally and vertically.

A further object of the invention is to provide improved means whereby the sight can be easily, quickly, and accurately adjusted in a lateral direction upon the vertically-adjustable portion of the sight-mounting and whereby it can, when desired, be quickly removed from such portion of the sight-mounting. According thereto the sight-mounting comprises a sight-carrying device that is pivoted to a suitable support or carrier adapted to be attached to the gun or its cradle or mounting and is adapted, together with the sight carried thereby, to be raised and lowered in a vertical plane or an approximately vertical plane about the pivot as a center by a cam formed in or by or in connection with which is a wheel or drum bearing a scale of ranges or degrees or scales for both ranges and degrees, the arrangement being such that the sight-carrying device will at all times hold the sight in a steady manner both laterally and vertically, and by rotating the said cam the sight-carrying device with sight can be easily and accurately adjusted in a vertical direction to suit requirement. The sight-carrying device and the sighting device may in some cases be made as one article. The lateral adjusting means for the sight comprises a vertically-adjustable holder, a sight-carriage pivoted thereto, so as to turn about a vertical axis, traversing means, and a catch device, the holder and carriage being engaged with one another for a limited angular movement of the carriage, but being adapted to become disengaged from one another when turned to a further extent limited by the catch device.

The invention further consists in various novel features of construction and combinations and arrangements of parts, which will be hereinafter described, and fully pointed out in the claims.

In the accompanying illustrative drawings, Fig. 4 is a cross-section corresponding to the line A A of Fig. 1, but drawn to a larger scale than that figure.

Figure 1:
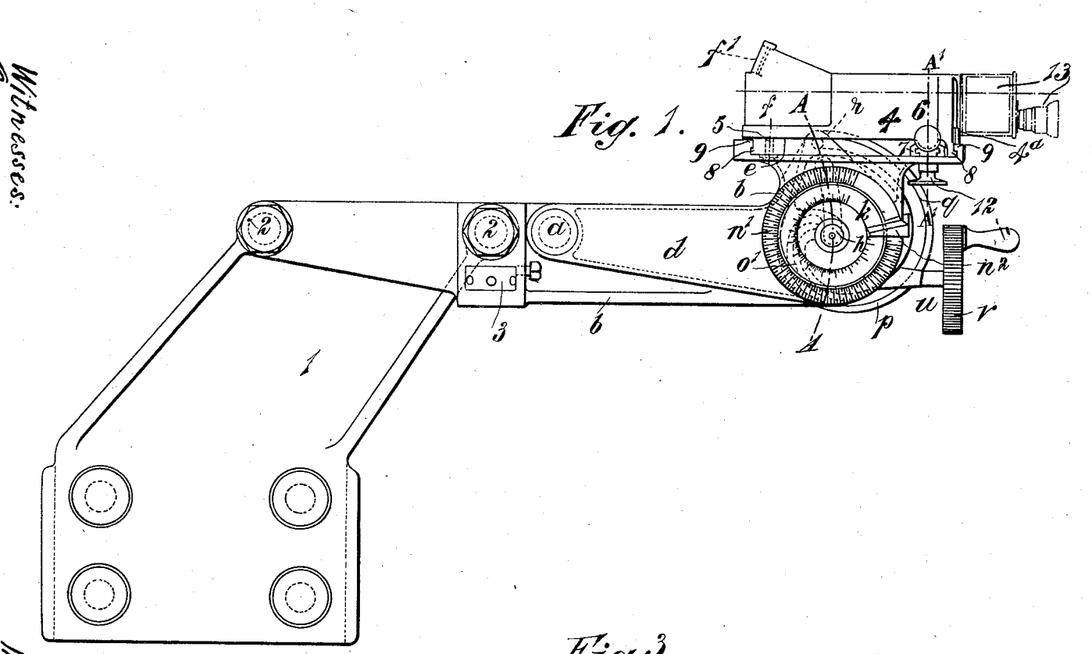
Figure 1 shows in side elevation, Fig. 2 in rear end elevation, and Fig. 3 in plan, a sight-mounting according to this invention suitable for ordnance.
Figures 2, 4:
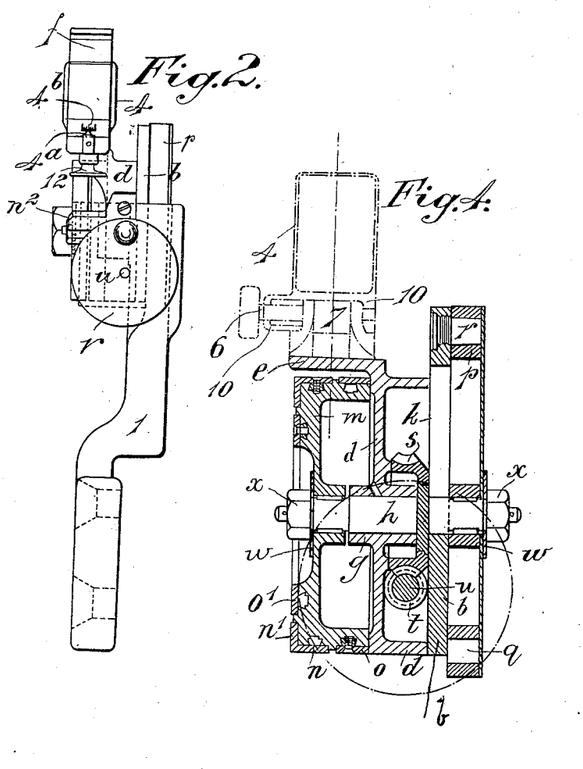
Figure 3:
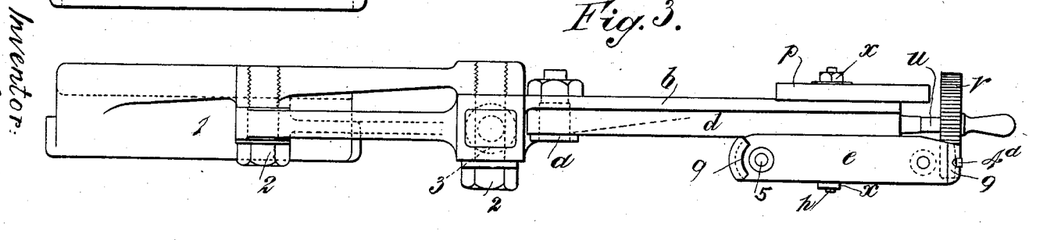
Figure 5:
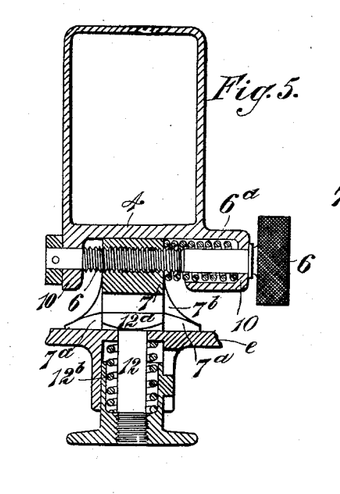
Fig. 5 is a cross-section on the line A' A' of Fig. 1, but drawn to a larger scale than that figure, showing a sight holding and adjusting device with spring-catch. Figs. $5^a$, $5^b$, and $5^c$ show, respectively, in side elevation, cross-section, and plan a nut used in such device. Figs. $5^d$ and $5^e$ are elevations at right angles to each other, and Fig. $5^f$ a plan showing a spring-catch used with such nut.
Figures 5A, 5B, 5C, 5D, 5E, 5F:
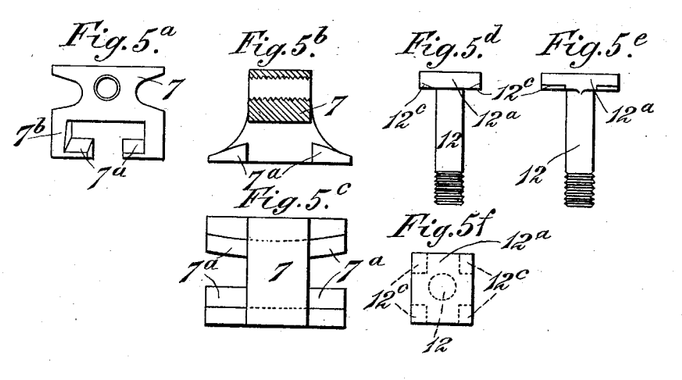
Figure 6:
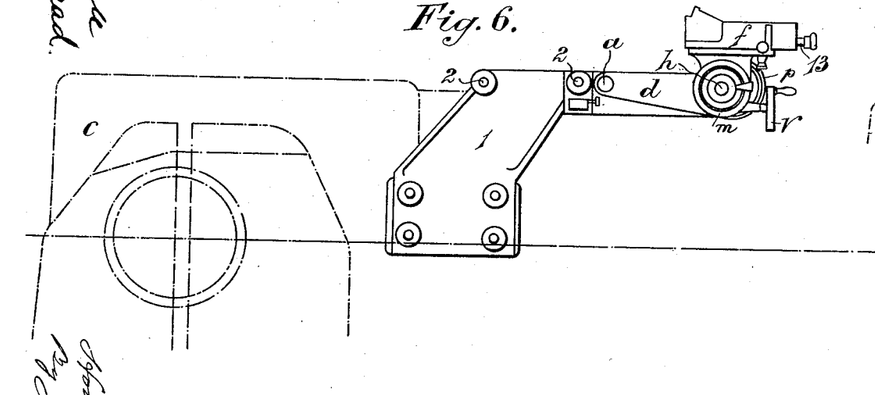
Figs. 6 and $6^a$ are side and rear views, respectively, showing to a smaller scale than Figs. 1, 2, and 3 the sight-mounting applied to a position-gun, a portion only of which is represented in dotted lines.
Figure 6A:
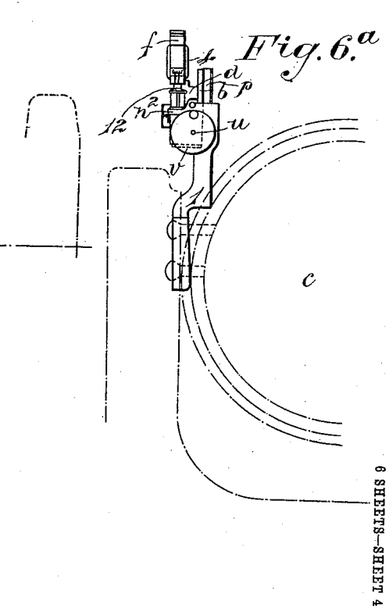
Figure 7:
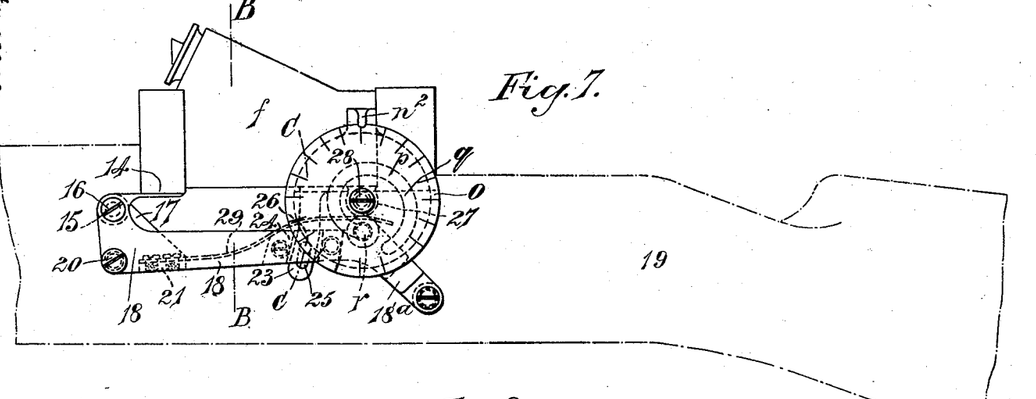
Figs. 7, 8, and 9 are similar views to Figs. 1, 2, and 3, respectively, showing a sight-mounting suitable for a rifle, a portion only of which is indicated in dotted lines.
Figures 8, 10, 11:
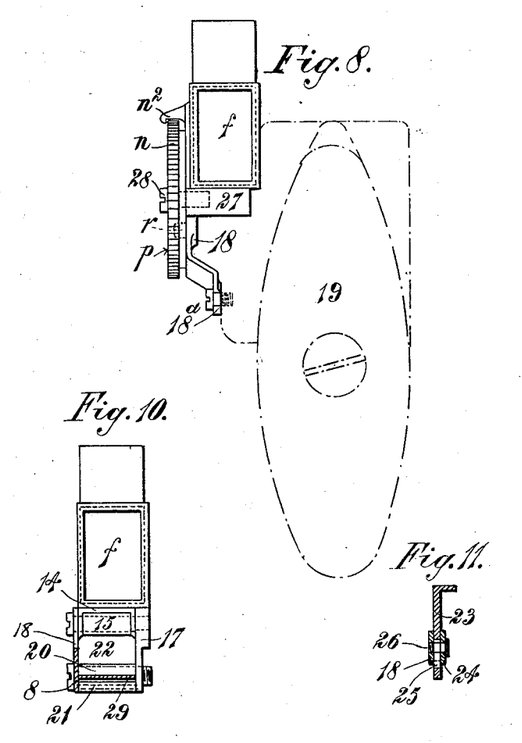
Figs. 10 and 11 are sections on the lines B B and C C, respectively, of Fig. 7.
Figure 9:
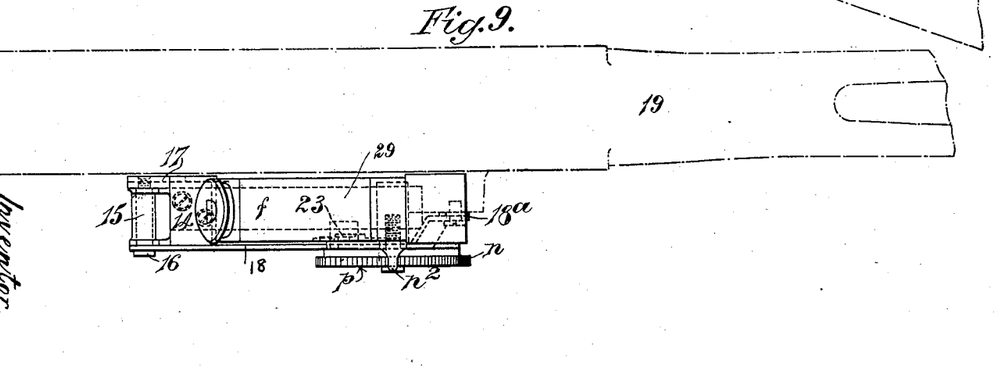

In the construction of sight-mounting shown in Figs. 1 to $6^a$, inclusive, there is jointed, by means of a pin $a$, to the outer side of a bracket $b$, arranged in a vertical or an approximately vertical plane parallel to that containing the axis of the gun $c$, to which the sight-mounting is applied, the forward end of a vertically-movable sight-carrier $d$ in the form of an elongated plate, the rear portion of which is suitably adapted at its upper part—as, for example, by providing it with a head or holder $e$—to carry the sighting device $f$ and at a lower part is provided with a bearing $g$, carrying a horizontal spindle $h$, that extends through an arc-shaped guiding-slot $k$, formed in the bracket $b$ and concentric to the pivot-pin $a$. Upon the outer end of the spindle $h$ is fixed a wheel or drum $m$, (hereinafter called a "drum,") the outer periphery of which is provided with two circular scales arranged side by side and formed, for example, on rings $n$ and $o$, fixed to the periphery of the drum, one of the scales—viz., that on ring $n$—serving for ranges and the other—viz., that on ring $o$—serving for degrees of elevation. Rings $n'$ and $o'$ having scales marked thereon for ranges and degrees, respectively, may also be fixed to the face of the drum. $n^2$ is an indicator fixed to the carrier $d$ and extending across the periphery and face of the drum $m$ to enable the extent of angular movement of the carrier $d$ for a given range to be readily determined. Upon the inner end of the spindle $h$ is fixed a cam-plate $p$, that is located at the inner side of the bracket $b$ and is formed with a cam-groove $q$, into which projects a pin $r$, fixed to and projecting from the inner side of the bracket $b$. Upon an intermediate part of the said spindle is fixed a worm-wheel $s$, with which gears a worm $t$, fixed on a longitudinal spindle $u$, carried by the pivoted plate $d$, and the outer rear end of which is adapted, as by a wheel $v$, to be operated by hand. The several parts are kept firmly in contact with one another sidewise—as, for example, by spring-plates or washers $w$, interposed between the central portions of the drum $m$ and cam-plate $p$ and nuts $x$ on the outer and inner end of the spindle $h$. As will be seen, the arrangement is such that by rotating the worm-spindle $u$ the cam-plate $p$ will, through the worm $t$, worm-wheel $s$, and spindle $h$, be also caused to rotate and by traveling in contact with the fixed pin $r$ will turn the pivoted sight-carrier $d$ and the sighting device $f$, carried thereby, in a vertical plane about the pin $a$ as a center, the extent of movement and the corresponding range being readily determined by the scales on the drum $m$.

The bracket $b$ may, as shown, be a normally horizontal or nearly horizontal bar secured to the cradle 1 of the gun $c$ by bolts 2, so that it can be raised and lowered by an adjusting-nut 3 in a well-known manner, or the said bracket $b$ may be fixed to some other part of the gun-mounting that moves with the gun during elevation or depression or direct to the gun.

Suitable means may be provided for easily and quickly locking the sight-carrier $d$ in its adjusted position. Usually, however, with the arrangement of worm-gearing shown no additional locking means will be necessary.

A sight-mounting of the kind hereinbefore described for use on position-mountings, barbette-mountings, and on field-mountings, and with machine-guns may advantageously be provided with a sight holding and adjusting device comprising a sight-carriage 4, in which the sighting device $f$ can be securely held, the normally horizontal head or holder $e$ on the pivoted sight-carrier $d$ and to which the front end of the sight-carriage 4 is pivoted at 5 so as to turn about a vertical axis, and traversing means, such as a screw 6 and nut 7, the arrangement being such that by operating the said traversing means the sight-carriage can be caused to turn in either direction about its pivot 5 as a center, so as to adjust the sighting device $f$ held thereby in a lateral or angular manner relatively to the axis of the gun $c$ to compensate for drift, wind-pressure, or other purpose. To admit of the ready removal of the sight-carriage 4 from the holder $e$, the front and rear ends of the sight-carriage and the adjacent ends of the holder are formed with engaging parts 8 and 9, respectively, that normally coact to retain the sight-carriage down upon the holder $e$, while permitting of its angular movement to a suitable extent to allow for all required degrees of lateral adjustment, but which will become disengaged from each other when the sight-carriage is turned to a sufficiently greater extent and will then allow of the sight-carriage being lifted clear of the holder. The traversing screw 6 is mounted in bearings 10, Fig. 5, on the sight-carriage 4 and works through a nut 7, Figs. $5^a$, $5^b$, $5^c$, which is located below the sight-carriage and is held in position laterally upon the holder $e$ by a rotary spring-catch or bolt 12, Figs. $5^d$, $5^e$, $5^f$, that has a rectangular-shaped head $12^a$ fitting between four lugs $7^a$ on a foot-piece or extension $7^b$ of the nut.

The length of the screw 6 limits the extent of angular adjustment of the sight-carriage, and the spring-catch 12 prevents the sight-carriage from being turned, except by the traversing screw 6, so that to turn the carriage 4 to the greater extent necessary to detach it from the holder $e$ the spring-catch 12 must be first disengaged from the nut 7 by raising it sufficiently against the action of its spring $12^b$ to lift its head $12^a$ clear of the lugs $7^a$. To enable the nut to be reëngaged and held by the spring-catch 12, its lugs $7^a$ are made wedge-shaped, so that when it is moved laterally in either direction toward the head $12^a$ of the catch one or other pair of the lugs will pass under the head, which is beveled at $12^c$ for the purpose, and lift the catch against the action of the spring $12^b$ until the head comes centrally between the lugs, whereupon it will be drawn down between them and hold the nut as before. A spring $6^a$, between the nut 7 and carriage 4, serves to prevent any looseness between these parts. A pointer $4^a$ and scale $4^b$ on the holder $e$ and carriage 4, respectively, Fig. 2, serve to indicate the angular position of the carriage relatively to the axis of the gun $c$.

The front of the sight-carriage 4 or of the the sighting device $f$ is or may be adapted to carry a night-sight. When the sighting device $f$ is, as in the example shown, of the type described in the said former specification, No. 683,203, the sight-carriage or sighting device is adapted to carry a lamp—for example, an electric incandescent lamp—to illuminate the cross or other object formed on the diaphragm $f'$, Fig. 1, and constituting the sight proper, as explained in the said former specification. When the sight-carriage 4 is, as shown, adapted to hold a sighting device $f$ of the kind hereinbefore referred to, its rear end is or may be provided with a magnifying eyepiece 13—such, for example, as one of well-known construction having two pairs of reflecting prisms and an object-glass designed to magnify the image of the sight produced in the said sighting device—or the rear end of the sight-carriage may be adapted to carry an ordinary telescope to admit of the image of the sight and of a distant object being more readily observed.

In the construction of sight-mounting shown in Figs. 7 to 11, inclusive, the sight-carrying device comprises a plate 14, formed at one end with a lug 15, by which it is journaled upon a horizontal pivot-pin 16 between two side plates 17 and 18, that form a support adapted to be fixed to the side of a rifle 19. The two plates 17 and 18 are connected together at a suitable distance apart, as by a distance-piece and bolt 20 and cross-piece 21, one of them—viz., the inner one, 17—being made short, and it may be of more or less triangular shape, as shown, and the other or outer one, 18, being made much longer and extended backward some distance behind the pivot-pin 16, its end portion $18^a$ being bent downward and inward, Figs. 7, 8, and 9, to facilitate its attachment to the rifle while at the same time leaving a free space 22, Fig. 10, in which the sighting device $f$ can move up and down. The sighting device is fixed at its forward end to the pivoted plate 14 and at an intermediate point is provided with a downwardly-extending plate 23, that is arranged to slide through a guide 24 on the plate 18, and is formed at its lower part with an arc-shaped slot 25, having its center at the axis of the pivot-pin 16, and through which extends a horizontal pin 26, fixed to the guide. Fixed to a lug 27 at the under side of the rear part of the sighting device $f$ and projecting from one side thereof is a pin 28, upon which is mounted to rotate a combined scale-drum and cam-plate $p$, the inner side of which is formed with a cam-groove $q$, into which projects a pin $r$, fixed to the outer side of the plate 18. The outer side of the combined drum and cam plate $p$ or the periphery thereof or each of these parts is provided with a scale or divisions $n$ or $o$ to represent distances or degrees, respectively, or, as shown, both of the parts mentioned may be provided with scales $n$ and $o$ for distances and degrees. Opposite the scale or scales is a pointer or index $n^2$, fixed to the sighting device $f$. As will be seen, the arrangement is such that by turning the combined scale-drum and cam-plate $p$ it will by reason of the engagement of the fixed pin $r$ with the cam-groove $q$ therein cause the sighting device $f$ to move in a vertical plane about the pivot-pin 16 as center, the extent of movement being readily determined by the aid of the scale $o$ and the pointer or index $n^2$. The combined drum and plate $p$ and the pin $r$ may be kept in close and firm contact with each other by a bent blade-spring 29, that is fixed at one end to the plates 17 and 18 through the cross-piece 21 and acts at its other end against the under side of the sighting device $f$.

Sight-mountings according to this invention can advantageously be used for carrying sighting devices other than those of the novel and peculiar type described in the said former specification.

What I claim is—

1. A sight-mounting for guns, comprising a plate-like support adapted to be connected to a gun so as to be in a vertical or nearly vertical plane and parallel to that containing the axis of the gun, a pin fixed to and projecting laterally from said support, a sight-carrier pivoted to said support so as to be capable of turning upward and downward parallel thereto and about a transverse axis and arranged to work in close contact with the adjacent flat surface of said support, a transverse spindle mounted in said sight-carrier and extending through said support, a cam-wheel and scale-drum connected to opposite ends of said spindle and located at opposite sides of said support and carrier, said cam-wheel being arranged to work in connection with said pin, means for automatically pressing said support and sight-carrier together in a lateral direction, and gearing for rotating said spindle.

2. A sight-mounting for guns, comprising a plate-bracket adapted to be fixed to a gun so as to be in a vertical or nearly vertical plane, a pin fixed to and projecting from one side of said bracket, a sight-carrier pivoted at its forward end to the opposite side of said bracket and arranged to slide against and in close contact therewith, a transverse spindle mounted in said sight-carrier and extending through said bracket, a cam-wheel fixed to one end of said spindle at one side of said bracket and engaging said pin, a scale-drum mounted on the opposite end of said spindle at the opposite side of said sight-carrier, a spring device for automatically pressing said sight-carrier against said support, and gearing for rotating said spindle with cam-wheel and scale-drum.

3. A sight-mounting for guns, comprising a plate-bracket adapted to be fixed to a gun and having its two opposite surfaces flat and arranged in vertical or nearly vertical planes, a sight-carrier pivoted at its forward end to one side of said bracket so that it can work up and down parallel to that side, a pin projecting from the opposite side of said bracket, a transverse spindle carried by and mounted to turn in said sight-carrier and to extend through a slot in said bracket concentric to the axis of movement of said sight-carrier, a cam-wheel mounted on the inner end of said spindle so as to turn therewith and formed with a cam-groove with which said pin engages, a scale-drum mounted on the outer end of said spindle so as to turn therewith, worm-gearing mounted on said sight-carrier and whereby said spindle with cam-wheel and scale-drum can be rotated by hand, and means adapted to automatically force said sight-carrier, cam-wheel and scale-drum laterally toward said bracket.

4. The combination with the cradle of a gun, of a plate-like bracket fixed to said cradle and carried thereby so as to be in a vertical or nearly vertical plane and parallel to the axis of the gun, a sight-carrier pivoted at its forward end to the outer side of said bracket, a laterally-projecting pin fixed to the inner side of said bracket, a transverse spindle mounted in said sight-carrier and extending through an arc-shaped slot in said bracket, a cam-wheel secured to the inner end of said spindle, bearing against the inner side of said bracket and formed with a cam-groove with which said pin engages, a drum secured to the outer end of said spindle, bearing against said sight-carrier and carrying scales for indicating vertical angular adjustment of said sight-carrier and ranges, spring plates or washers acting to automatically press said sight-carrier and cam-wheel closely against opposite sides of said bracket, a worm-wheel fixed to said spindle and located between said bracket and sight-carrier, and a worm in gear with said worm-wheel and carried by a spindle mounted in said sight-carrier and provided with a hand-wheel, substantially as described.

5. In a sight-mounting for guns, a sight holding and adjusting device comprising a sight-carriage, a holder to which said sight-carriage is pivoted so as to be capable of turning in a lateral direction thereon, and traversing means adapted to turn said sight-carriage about its pivot, the front and rear end of said sight-carriage and the adjacent ends of said holder being formed with engaging parts that normally hold the sight-carriage upon said holder while permitting of the necessary angular movement for lateral adjustment but which will become disengaged from each other when the sight-carriage is turned to a sufficiently greater extent, substantially as described for the purpose specified.

6. In a sight-mounting for guns, the combination with a vertically-adjustable sight-carrier, of a sight holding and adjusting device comprising a sight-carriage, a holder carried by said sight-carrier and to which said sight-carriage is pivoted so as to be capable of turning in a lateral direction thereon, the front and rear ends of said sight-carriage and the adjacent ends of said holder being formed with engaging parts that normally hold the sight-carriage upon said holder while permitting of the necessary angular movement for lateral adjustment but which will become disengaged from each other when the sight-carriage is turned to a sufficiently greater extent, traversing means adapted to turn said sight-carriage about its pivot, and means adapted to limit the action of said traversing means but capable of being disconnected from said traversing means and allow of said sight-carriage being turned to a greater extent, substantially as described for the purpose specified.

7. In a sight-mounting for guns, the combination with a vertically-adjustable sight-carrier, of a sight holding and adjusting device comprising a sight-carriage, a holder carried by said sight-carrier and to which said sight-carriage is pivoted so as to be capable of turning in a lateral direction thereon, the front and rear end of said sight-carriage and the adjacent ends of said holder being formed with engaging parts that normally hold the sight-carriage upon said holder while permitting of the necessary angular movement for lateral adjustment but which will become disengaged from each other when the sight-carriage is turned to a sufficiently greater extent, traversing means comprising a traversing screw carried by said sight-carriage and a nut in which said screw works, and a spring-catch adapted to hold said nut upon said holder and allow it to turn thereon but to prevent it turning on said screw or moving laterally, substantially as described.

8. In a sight-mounting for guns, the combination with a vertically-adjustable sight-carrier, of a sight holding and adjusting device comprising a sight-carriage, a holder carried by said sight-carrier and to which said sight-carriage is pivoted so as to be capable of turning in a lateral direction thereon, the front and rear ends of said sight-carriage and the adjacent ends of said holder being formed with segmental-shaped interlocking parts that normally hold said sight-carriage upon said holder, a traversing screw mounted on said sight-carriage, a nut through which said screw works, and a spring-catch that normally prevents said nut turning around said screw or moving laterally upon said holder while permitting it to turn about an axis at right angles to the top of said holder and which can be disengaged from said nut, substantially as described for the purpose specified.

9. In a sight-mounting for guns, the combination with a vertically-adjustable sight-carrier, of a sight holding and adjusting device comprising a sight-carriage, a holder carried by said sight-carrier and to which said sight-carriage is pivoted so as to be capable of turning in a lateral direction thereon, the front and rear ends of said sight-carriage and the adjacent ends of said holder being formed with segmental-shaped interlocking parts that normally hold said sight-carriage upon said holder, a traversing screw mounted on said sight-carriage, a nut through which said screw works, said nut having a foot-piece formed with a recess in its lower part and provided with two pairs of wedge-shaped projections, and a vertically-movable rotary spring-bolt the head of which is normally located between said projections but is adapted to be disengaged therefrom, substantially as described.

Signed at 8 St. Martins Place, Trafalgar Square, London, England, this 6th day of November, 1901.

HOWARD GRUBB.

Witnesses:
　WALTER E. ROCHE,
　WILLIAM CROSS.